United States Patent Office 2,794,615
Patented June 4, 1957

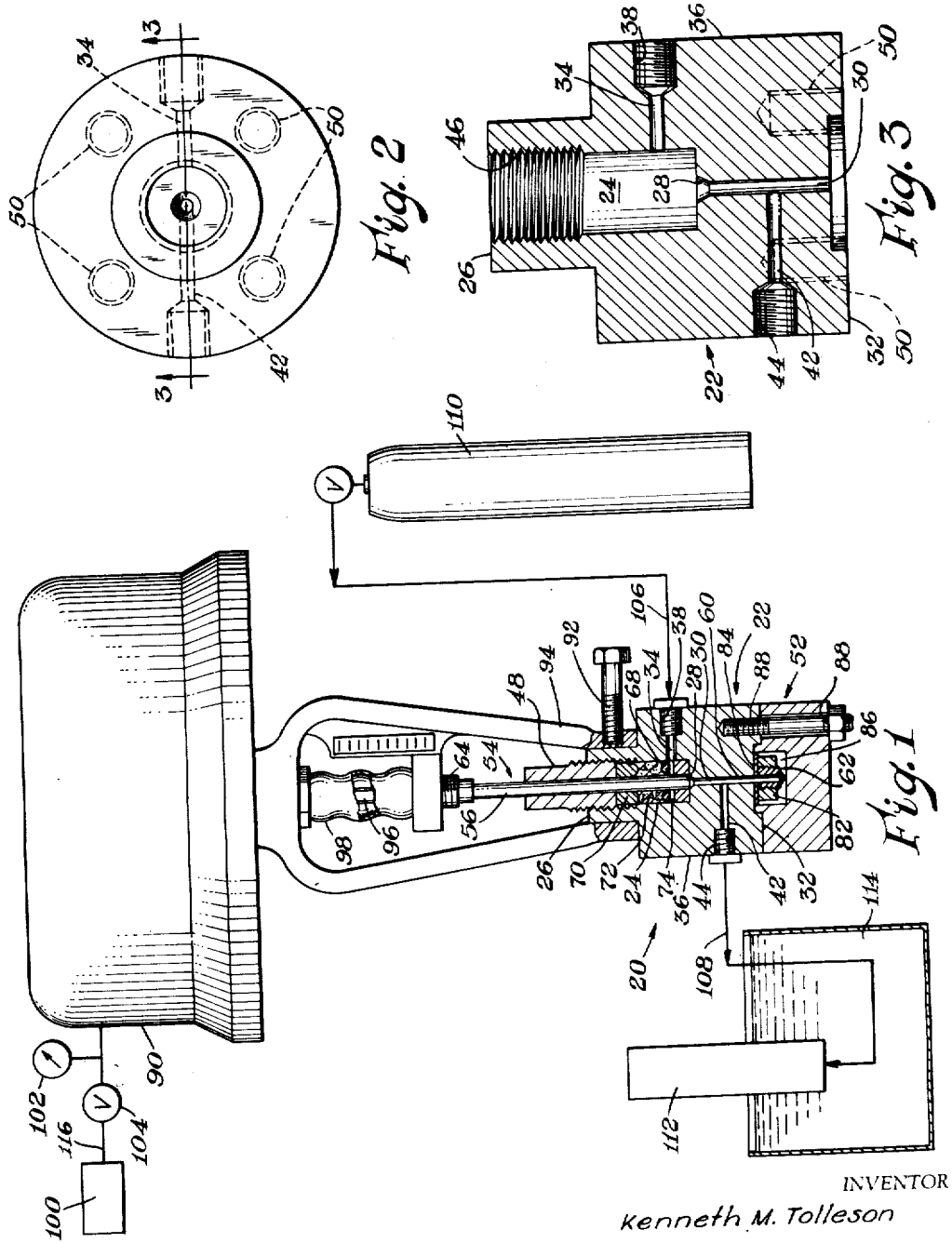

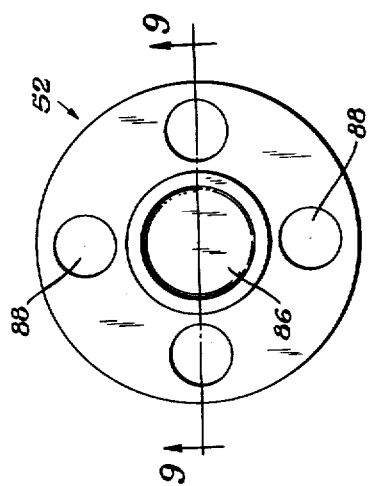
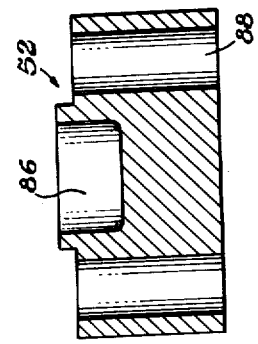
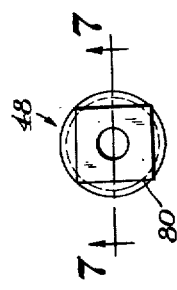
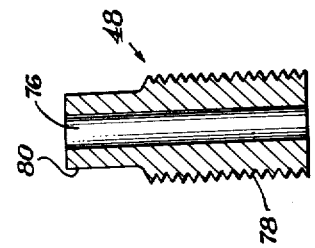

2,794,615

HIGH PRESSURE VALVE

Kenneth M. Tolleson, Lake Jackson, Tex., assignor to The Dow Chemical Company, Midland, Mich., a corporation of Delaware Application July 15, 1954, Serial No. 443,577

7 Claims. (Cl. 251—61)

This invention relates to high pressure metering valves which are adapted to accurately control a small fluid flow with a large pressure drop across the valve, and particularly to valve assemblies which are adapted to be operated from a remote point.

In some chemical processes it is necessary to accurately meter small quantities of fluid from lines operated at pressures as high as thousands of atmospheres. To take small amounts of fluid, a few cubic centimeters per minute, for example, from a high pressure line presents severe demands on the valve in the high pressure line. The valve must withstand great pressures, should be positive acting, should be of rugged, simplified construction since valve repairs in high pressure systems are usually not conveniently made, and in view of the high pressures involved in the system with which it is to be used, should be capable of being opened and closed from a remote point to give predetermined flow rates therethrough.

Known types of high pressure valves fall short of one or more of the above named desirable features or are unduly expensive.

A principal object of this invention is to provide an improved high pressure valve which is capable of metering small amounts of fluid.

Another object of this invention is to provide an improved high pressure valve of simplified construction.

A further object of this invention is to provide an improved, more reliable high pressure valve of simplified construction which is adapted to be actuated from a remote point.

In accordance with this invention there is provided a needle type metering valve in which the lower part of the valve stem is elongated and of reduced cross section as compared to the upper part thereof. Means utilizing the spring characteristics of the valve stem metal are provided at the lower end for seating the valve stem under tension; and means utilizing the spring characteristics of the valve stem metal are also provided for un-seating said valve in accordance with tension applied at the opposite end of the valve stem. Because the elastic limit of the valve stem metal is not exceeded when the valve is opened, the valve stem re-seats when the tension is released.

The invention, as well as additional objects and advantages thereof will best be understood when the following detailed description is read in connection with the accompanying drawings in which:

Fig. 1 is a diagrammatic view, partly in section, of a valve assembly in accordance with this invention;

Fig. 2 is a plan view of the body of the valve shown in Fig. 1;

Fig. 3 is a sectional view taken along the lines 3—3 of Fig. 2;

Fig. 4 is a side elevational view of the valve stem of the valve shown in Fig. 1;

Fig. 5 is a plan view of the valve stem shown in Fig. 4;

Fig. 6 is a plan view of the packing follower of the valve shown in Fig. 1;

Fig. 7 is a sectional view taken along the lines 7—7 of Fig. 6;

Fig. 8 is a plan view of the end cap of the valve shown in Fig. 1, and

Fig. 9 is a sectional view taken along the lines 9—9 of Fig. 8.

Referring to Fig. 1, the valve assembly 20 includes a valve body 22 formed of a single massive piece of steel having a centrally disposed bore 24 extending from the top 26 thereof to the valve seat 28. The valve seat 28 comprises a frusto-conically shaped surface, with the side walls of the seat 28 making an angle, 60 degrees, for example, with the horizontal axis of the body 22. A bore 30 of smaller diameter than the bore 24 extends between the valve seat 28 and the lower end 32 of the body 22 and is coaxial with the bore 24. Thus, a bore of varying diameter extends through the body 22. The lower end 32 of the body 22 is counterbored around the small diametered bore 30.

An inlet passageway 34 extends through the side wall 36 and communicates with the bore 24. Th enlarged outer end 38 of the inlet bore 34 is tapped to permit a threaded inlet pipe to be attached thereto.

The outlet passage for the valve is provided by the passageway 42 which extends between the small diameter bore 30 and the side wall 36. The enlarged outer end 44 of the passageway 42 adjacent to the side wall 36 is tapped similarly to that of the inlet 34. Likewise, the upper end 46 of the bore 24 is tapped to permit the packing follower 48 to be secured in the bore 24.

Four tapped bores 50 extend into the lower part of the valve body 22 and are used in securing the end cap 52 to the valve body 22. The apertures 50 are oriented 45° from the inlet and outlet apertures 34, 42, as shown more clearly in Fig. 2.

An elongated valve stem 54 extends through the valve body 22. The valve stem 54 comprises an upper cylindrical tension applying part 56, a tapered valve plug surface 58 and a lower, elongated cylindrical part 60 of smaller diameter than the upper cylindrical part 56. The lower end of the lower cylindrical part 60 has a bushing 62 secured thereto, as by silver soldering. The peripheral surface of the bushing 62 is threaded. The upper end 64 of the valve stem 54 is also threaded to permit the driving arm or shaft 96 of the valve to be attached thereto.

The diameter of the lower cylindrical part 60 of the valve stem is slightly smaller than the diameter of the aperture 30 into which the lower cylindrical part 60 fits. The upper cylindrical part 56 of the valve stem 54 passes through two packing rings 68, 70, a tetrafluoroethylene packing bushing 72, and the hollow packing follower 48. The lower packing ring 68 has an aperture 74 extending laterally therethrough. The aperture 74 is aligned with the inlet aperture 34 to provide a communication between the valve inlet aperture 34 and the interior of the valve. The packing bushing 72 provides a close fit between the valve stem 54 and the wall of the large diameter bore 24 of the valve body 22. As the packing follower 48 is tightened, to advance it into the cylindrical bore 24, the packing bushing 72 expands as it is compressed between the packing rings 68, 70, making a fluid tight seal at that point between the valve stem 52 and the wall of the bore 24 in the valve body 22.

The packing follower 48, shown in detail in Figs. 6 and 7, is hollow and generally cylindrically shaped. The packing follower bore 76 is slightly larger than the larger diameter of the valve stem 54 which passes therethrough. The lower outer part 78 of the packing follower is threaded and engages the threaded inner surface 46 of the bore 24 in the valve body 22. The top part 80 of the packing follower 48 is "squared off" to facilitate the tightening of the packing follower to expand the packing bushing 72.

The valve plug part 58 of the valve stem 54 is shaped to cut off the flow of fluid through the valve when the plug 58 is seated. The seating of the plug 58 in the valve seat 28 is accomplished by tightening a nut 82 which engages the threaded bushing 62 which is attached to the lower end of the valve stem 54. A washer 84 of aluminum or some other compressible material is placed between the nut 82 and the bottom of the valve body 22 to provide a fluid tight seal between the lower end of the valve stem 52 and the valve body 22 when the nut 60 is tightened to put the valve stem 54 under tension and seat the valve plug 56 into the valve seat 28.

The end cap 52 of the valve assembly, shown in detail in Figs. 8 and 9, is of generally cylindrical configuration with a hollowed out central part 86 to permit the end cap 52 to be attached to the lower end 32 of the valve body 22 and over the nut 82. Four bolts extend through the bores 88 and are used to attach the end cap 52 to the valve body 22. A gasket may, if desired, be disposed between the end cap 52 and the valve body 22 to effect a better seal between the two parts.

As shown in Fig. 1, the motive power for actuating the valve assembly is the air motor 90. The valve is clamped by means of the bolt 92 to the bracket 94 extending downward from the air motor 90. A shaft 96 which extends downwardly from the air motor 90 and is covered by the bellows 98, is attached to the threaded end 64 of the valve stem 54. The shaft 96 moves longitudinally in response to a change in air pressure in the air motor 90. Air is supplied, under pressure, to the air motor 90 from a source 100. A pressure gauge 102 is provided in the air line 116 between a low pressure type valve 104 and the air motor 90.

The operation of the high pressure valve assembly 20 of the invention is as follows. A high pressure line 106 is attached to the inlet 34 and to a high pressure fluid source 110. A low pressure outlet line 108 is attached to the valve outlet 42 and for the purpose of illustration, leads into an inverted beaker 112 which has its open end under a water bath 114. To open the valve and permit the flow of fluid through the valve 20, the low pressure valve 104 in the air line 116 is opened and air is passed through the air motor 90. The torque produced in the air motor 90 is coupled to the shaft 96, and is used to elongate the thin lower part 60 of the valve stem 54. As the thin lower part 60 of the valve stem 54 is stretched, the valve plug 58 moves away from the valve seat 28, permitting a small flow of fluid through the high pressure valve. Since the degree of stretching of the lower end 60 of the valve stem 54 may be very small, the flow through the valve 20 is small and easily controlled even though the high pressure side of the valve may be at a pressure of up to thousands of atmospheres.

The valve stem 54 is made of a material, such as 18–8 stainless steel, for example, which has spring-like qualities. It has been found that, so long as the elastic limit of the valve stem 54 is not exceeded, the stem length returns to normal once the tension is removed therefrom.

This use of the spring-like properties of a valve stem results in a valve which somewhat resembles a spring-loaded valve, but does not utilize external springs which would add to the cost and complicate the construction of the valve. Further, the valve of the invention operates without any "chattering" due to the high pressure.

Valves made in accordance with this invention may be actuated by other means than the air motor 90 which is illustrated. For example, hydraulic pressure could be used to un-seat the valve, or operation of the valve could be accomplished manually through a leverage system.

However, it is usually desirable, when working with high pressure equipment, to open and close valves from a remote point, and the air motor actuating means illustrated is well adapted for remote operation of the valve.

Since the flow through the valve is a function of the elongation of the valve stem which is in turn a function of the pressure maintained through the air motor, the gauge 102 may be calibrated in rate of flow through the valve assembly 20 rather than in air pressure units.

To calculate the movement of the valve plug 58 off the valve seat 28, a basic strength of materials relationship can be used. This relationship says that the unit strain (or unit elongation) is equal to the unit stress divided by the modulus of elasticity of the material under stress.

The above relationship may be illustrated as follows. Assume that the smaller end of the valve stem 54 is 1/8 inch in diameter and 1 inch long and that the force at the threaded end 64 of the valve stem 54 is 175 pounds.

The unit stress on the small diameter part 60 of the valve stem 54 is equal to the force, 175 pounds, divided by the area of the 1/8 inch small diameter part 60, .0123 sq. inch, or 14,210 pounds per square inch in the 1/8 inch diameter stem.

The unit strain (unit elongation) is equal to the unit stress, 14,210 pounds per square inch, divided by the modulus of elasticity of the material (30,000,000 pounds per square inch in the case of a valve stem made of 18–8 stainless steel), or .00475 inch per inch.

Since the 1/8 inch diameter lower part 60 of the valve stem 54 is 1 inch long, the plug should move off the seat .00475 inch if the small tensile force used to seat the valve initially is ignored. Also, the diameter of other parts of the valve stem is so much larger than the 1/8 inch diameter of the part 60 that the elongation of the other parts of the stem 54 may, for practical purposes, be neglected.

If the force applied to the stem is never large enough to cause a unit stress which is larger than the proportional limit of the material, then, when the force is removed, the valve stem 54 will return to its original seating position.

Because the un-seating of the valve may be controlled within very close limits, a small and very accurate flow rate through the valve may be maintained even though the pressure drop across the valve is many thousands of pounds.

The flow rate through the valve depends on the size of the valve plug and seat, the length of the section of the valve stem which is to be elongated, and on the force applied to elongate the valve stem. The materials of construction will depend on the type of service to which the valve will be put. For example, materials which do not corrode when in contact with the fluid passing through the valve should be used. Obviously, the valve stem material must have a definite proportional limit.

The means of applying the actuating force to the valve and the means of connecting the inlet and outlet lines may be subject to wide variations without departing from the scope of the invention. Also, the means for applying the actuating force, illustrated herein as being separate from the valve, can be an integral part thereof.

I claim:

1. A valve assembly adapted for high pressure metering of fluids, comprising a valve body, a bore extending through said valve body, a valve seat disposed intermediate the ends of said bore and communicating therewith, a fluid inlet passageway and a fluid outlet passageway, each of said passageways extending inwardly from a surface of said valve body and being in communication with said valve seat, a valve stem extending into said bore and having an elongated part which is of smaller cross section than the remainder of said valve stem, said elongated part being disposed substantially entirely on one side of said valve seat, said valve stem including a valve plug adapted to closely fit into said valve seat to form a fluid tight seal therewith when said valve is seated, means secured to said elongated part for maintaining said valve seated under tension when said valve is closed and for providing a fluid tight seal between one open end of said bore, and the adjacent peripheral surface of said valve body, tension applying means for unseating said valve plug, said tension applying means extending from said valve plug through the other open end of said bore and being mechanically coupled to said valve seat, compressible packing means for effecting a fluid tight seal between said tension applying means and said valve body, said elongated part of said valve stem being composed of a material having a high modulus of elasticity whereby the elongated part of said valve stem stretches and said valve plug rises off the valve seat when tension is applied to said valve stem through said tension applying means and said valve plug re-seats when the tension on said tension applying means is released.

2. A valve assembly adapted for high pressure metering of fluids, comprising a valve body, a bore extending through said valve body, a valve seat disposed intermediate the ends of said bore and communicating therewith, a fluid inlet passageway and a fluid outlet passageway, each of said passageways extending from a surface of said valve body into said bore, one of said passageways opening into said bore between the valve seat and one of the open ends of said bore and the other of said passageways opening into said bore between the valve seat and the other open end of said bore, a valve stem extending into said bore and having an elongated part which is of smaller cross section than the remainder of said valve stem, said elongated part being disposed substantially entirely on one side of said valve seat, said valve stem including a valve plug adapted to closely fit into said valve seat to form a fluid tight seal therewith when said plug is seated, means secured to said elongated part for maintaining said valve plug seated under tension when said valve is closed and for providing a fluid tight seal between one open end of said bore and the adjacent peripheral surface of said valve body, mechanical means extending from said valve plug through the other open end of said bore for tensioning the elongated part of said valve stem, compressible packing means for effecting a fluid tight seal between said mechanical means and said valve body, said elongated part of said valve stem being composed of a material having a high modulus of elasticity whereby the elongated part of said valve stem stretches and said valve plug rises off the valve seat when tension is applied to said valve stem through said mechanical means and said valve plug re-seats when the tension on said mechanical means is released.

3. A valve assembly adapted for high pressure metering of fluids, comprising a valve body, a bore extending through said valve body, said bore including a large diameter portion and a smaller diameter portion, a valve seat disposed between said two portions of the bore, a fluid inlet passageway and a fluid outlet passageway, each of said passageways extending from a surface of said valve body into said bore, one of said passageways opening into the large diameter portion of the bore and the other of said apertures opening into the small diameter portion of the bore, a valve stem extending within said bore and having an elongated part which is of smaller cross section than the remainder of said valve stem, said elongated part being disposed substantially entirely on the side of said valve seat which faces the smaller diameter portion of said bore, said valve stem including a valve plug adapted to closely fit into said valve seat to form a fluid tight seal therewith when said plug is seated, means secured to said elongated part of said valve stem for maintaining said valve plug seated under tension when said valve is closed and for providing a fluid tight seal between one open end of said bore and the adjacent peripheral surface of said valve body, mechanical means extending from said valve plug through the other open end of said bore for tensioning the elongated part of said valve stem, said mechanical means being coupled to said valve plug, compressible means for effecting a fluid tight seal between said tension applying means and said valve body, said elongated part of said valve stem being composed of a material having a high modulus of elasticity whereby the elongated part of said valve stem stretches and said valve plug rises off the valve seat when tension is applied to said valve stem through said mechanical means and said valve plug re-seats when the tension on said mechanical means is released.

4. A valve assembly adapted for high pressure metering of fluids, comprising a valve body, a bore extending through said valve body, said bore including a large diameter portion and a smaller diameter portion, a valve seat disposed between said two portions of the bore, a fluid inlet passageway and a fluid outlet passageway, each of said passageways extending from a surface of said valve body into said bore, one of said passageways opening into the large diameter portion of the bore and the other of said apertures opening into the smaller diameter portion of the bore, a valve stem extending within said bore and having an elongated part which is of smaller cross section than the remainder of said valve stem, said elongated part being disposed substantially entirely on the side of said valve seat which faces the smaller diameter portion of said bore, said valve stem including a valve plug adapted to closely fit into said valve seat to form a fluid tight seal therewith when said valve plug is seated, means secured to said elongated part of said valve stem for maintaining said valve plug seated under tension when said valve is closed and for providing a fluid tight seal between one open end of said bore and said valve body, mechanical means extending from said valve plug to the other end of said bore for tensioning said elongated part of said valve stem, compressible packing means for effecting a fluid tight seal between mechanical means and said valve body, said elongated part of said valve stem being composed of a material having a high modulus of elasticity whereby the elongated part of said valve stem stretches and said valve plug rises off the valve seat when tension is applied to said valve stem through said mechanical means and said valve plug re-seats when the tension on said mechanical means is released.

5. A system for metering fluid from a high pressure line to a low pressure line which is adapted to be remotely controlled, said system comprising a valve including a valve body, a bore extending through said valve body, said bore including a large diameter portion and a small diameter portion, a valve seat disposed between said two diameter portions of the bore, a fluid inlet passageway and a fluid outlet passageway, each of said passageways extending from a surface of said valve body into said bore, one of said passageways opening into the large diameter portion of the bore and the other of said passageways opening into the small diameter portion of the bore, a valve stem extending within said bore and having an elongated part which is of smaller cross section than the remainder of said valve stem, said elongated part being disposed substantially entirely on the side of said valve seat which faces the small diameter portion of said bore, said valve stem having a valve plug adapted to closely fit into said valve seat to form a fluid tight seal therewith when said plug is seated, means secured to said elongated part of said valve stem for maintaining said valve plug seated under tension when said valve is closed and for providing a fluid tight seal between one open end of said bore and the adjacent peripheral surface of said packing gland, mechanical means extending from said valve plug to the other end of said bore for tensioning said elongated part of said valve stem, compressible packing means for effecting a fluid tight seal between said mechanical means and said valve body, said elongated part of said valve stem being composed of a material having a high modulus of elasticity whereby the elongated part of said valve stem stretches and said valve plug is caused to rise off the valve seat when tension is applied to said valve stem through said mechanical means and said valve plug re-seats when the tension on said mechanical means is released, and means for applying a controlled force to said mechanical means to un-seat said valve plug a pre-determinable amount.

6. A system in accordance with claim 5, wherein said means for applying a controlled force comprises an air motor whose torque is a function of the air pressure applied thereto.

7. A valve assembly in accordance with claim 1, wherein said fluid outlet passageway opens into the small diameter part of said bore.

References Cited in the file of this patent

UNITED STATES PATENTS 1,755,192    Scott _____ Apr. 22, 1930

FOREIGN PATENTS 921,787    France _____ Jan. 20, 1947

UNITED STATES PATENT OFFICE
CERTIFICATE OF CORRECTION

Patent No. 2,794,615　　　　　　　　　　　　　　　　　　June 4, 1957

Kenneth M. Tolleson

It is hereby certified that error appears in the printed specification of the above numbered patent requiring correction and that the said Letters Patent should read as corrected below.

Column 5, line 75, for "compressible means" read -- compressible packing means --.

Signed and sealed this 15th day of October 1957.

(SEAL)
Attest:
KARL H. AXLINE

Attesting Officer　　　　　　　　　　　　　　　　　ROBERT C. WATSON
　　　　　　　　　　　　　　　　　　　　　　　　　　Commissioner of Patents